(12) United States Patent
Nakamura et al.

(10) Patent No.: US 7,660,975 B2
(45) Date of Patent: Feb. 9, 2010

(54) ELECTRONIC APPARATUS AND CONTROL METHOD THEREOF

(75) Inventors: Hidenori Nakamura, Shimosuwa-machi (JP); Shinji Nakamiya, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 439 days.

(21) Appl. No.: 11/287,238

(22) Filed: Nov. 28, 2005

(65) Prior Publication Data

US 2006/0129883 A1   Jun. 15, 2006

(30) Foreign Application Priority Data

Nov. 29, 2004 (JP) ............................. 2004-344966

(51) Int. Cl.
 G06F 9/00 (2006.01)
 G06F 9/24 (2006.01)
 G06F 15/177 (2006.01)

(52) U.S. Cl. ............................. 713/1; 713/300; 368/64; 714/2; 714/48

(58) Field of Classification Search ...................... 713/1, 713/300; 368/64; 714/2, 48
See application file for complete search history.

(56) References Cited

U.S. PATENT DOCUMENTS

| | | | | |
|---|---|---|---|---|
| 4,730,287 A | * | 3/1988 | Yoshino et al. | 368/205 |
| 5,262,933 A | * | 11/1993 | Shyi-Hon | 363/49 |
| 5,291,118 A | * | 3/1994 | Kojima | 320/150 |
| 5,539,910 A | * | 7/1996 | Brueckmann et al. | 713/340 |
| 5,630,155 A | * | 5/1997 | Karaki et al. | 713/340 |
| 5,886,954 A | * | 3/1999 | Asami et al. | 368/67 |
| 5,889,736 A | * | 3/1999 | Fujita et al. | 368/66 |
| 5,968,178 A | * | 10/1999 | Williams et al. | 713/340 |
| 6,076,172 A | * | 6/2000 | Kimura et al. | 714/24 |
| 6,112,320 A | * | 8/2000 | Dien | 714/51 |
| 6,178,516 B1 | * | 1/2001 | Meade | 713/300 |
| 6,757,220 B1 | * | 6/2004 | Nakamura et al. | 368/204 |
| 6,816,439 B1 | * | 11/2004 | Kawahara et al. | 368/64 |
| 6,956,794 B2 | * | 10/2005 | Nakamura et al. | 368/203 |
| 2003/0128631 A1 | * | 7/2003 | Nakamura et al. | 368/204 |

FOREIGN PATENT DOCUMENTS

| | | |
|---|---|---|
| JP | H01-91936 U | 6/1989 |
| JP | H05-257751 A | 10/1993 |
| JP | H09-264971 A | 10/1997 |
| JP | H11-6885 A | 1/1999 |

* cited by examiner

*Primary Examiner*—Thomas Lee
*Assistant Examiner*—Jaweed A Abbaszadeh
(74) *Attorney, Agent, or Firm*—Global IP Counselors, LLP (57) ABSTRACT

An electronic apparatus wherein an abnormal control routine of the control unit can be prevented, or an abnormal control routine that has been started by the control unit can be rapidly halted is provided. An electronic apparatus having a control unit, peripheral circuits whose operations are controlled by the control unit, and a rechargeable battery for feeding operation power to the control unit and the peripheral circuits, wherein an initialization signal RT4 is continuously output to the control unit during a period of time (during time t1 to t4) that the voltage fed to the control unit is equal to or less than the voltage V1 for assured operation of the control unit, and is equal to or greater than the start voltage VX for starting the operation of the control unit.

9 Claims, 4 Drawing Sheets

ELECTRONIC APPARATUS AND CONTROL METHOD THEREOF

CROSS-REFERENCE TO RELATED APPLICATIONS

This application claims priority to Japanese Patent Application No. 2004-344966. The entire disclosure of Japanese Patent Application No. 2004-344966 is hereby incorporated herein by reference.

BACKGROUND OF THE INVENTION

1. Field of the Invention

The present invention generally relates to an electronic apparatus provided with a control unit. More specifically, the present invention relates to an electronic apparatus provided with a control unit, peripheral circuits whose operations are controlled by the control unit, and a rechargeable battery to feed operation power to the control unit and the peripheral circuits, and to a control method thereof.

2. Background Information

CPU-type electronic clocks that are used in microcomputers are known in prior art. Such CPU-type electronic clocks are provided with a CPU (control unit), ROM and RAM, an oscillation circuit that generates a system clock, and peripheral circuits composed of clock driving circuits that are controlled by the CPU and of circuits that generate interrupts. There are electronic clocks of this type that are provided with a reset generation circuit that outputs an initialization signal to the CPU when a reset signal is produced. Examples of the use of the circuit include when the user carries out a reset operation, when power ON is detected (battery change), and when a reset signal is input to the reset terminal exposed when the back cover of the clock is opened (as shown in Japanese Laid-Open Patent Application No. 6-161608).

In a CPU-type electronic clock, since the peripheral circuits operate at a voltage V2, which is lower than an operation-assured voltage V1 of the CPU (control unit), the peripheral circuits will operate while the remaining capacity of the battery is between voltages V1 and V2, but the CPU may start abnormal control routines. When the CPU carries out abnormal control routines, the peripheral circuits are controlled by such control routines, and the peripheral circuits also do not operate in a normal manner.

Nevertheless, even if the user resets the system when the peripheral circuits stop operating in a normal manner, the CPU cannot carry out initialization procedures when the remaining capacity of the battery is low (in the vicinity of voltage V2, for example), and abnormal operation in the peripheral circuits cannot be stopped. For this reason, when a configuration is adopted that uses a rechargeable battery and the rechargeable battery is recharged with power generated by the power generation apparatus (solar panel, or the like), once the CPU begins an abnormal routine due to a drop in the voltage of the rechargeable battery, the rechargeable battery is suitably recharged, and so the abnormal routine continues, circuits not expected to operate suddenly begin to operate (continuous motor pulse output, for example), and power is wasted.

A condition in which such power is consumed is disadvantageous in that the rechargeable battery does not satisfactorily charge, the electronic apparatus cannot be activated, and other problems are created unless the power generating capacity of the power generating device is increased (unless a strong light is directed to the solar panel, for example).

In view of the above, it will be apparent to those skilled in the art from this disclosure that there exists a need for an improved an electronic apparatus provided with a control unit, peripheral circuits whose operations are controlled by the control unit, and a rechargeable battery for feeding operation power to the control unit and the peripheral circuits, and to a control method thereof. This invention addresses this need in the art as well as other needs, which will become apparent to those skilled in the art from this disclosure.

SUMMARY OF THE INVENTION

The present invention addresses the aforementioned problems, and an object thereof is to provide an electronic apparatus that can avoid abnormal control routines by the control unit, or to halt rapidly abnormal control routines by the control unit, and to provide a control method thereof.

In order to solve the above-described problems, according to a first aspect of the present invention an electronic apparatus is provided. The electronic apparatus has a control unit, peripheral circuits whose operations are controlled by the control unit, and a rechargeable battery to feed operation power to the control unit and the peripheral circuits. Further, the electronic apparatus has a continuous initialization device to output continuously an initialization signal to the control unit during the period of time that the voltage fed to the control unit is equal to or less than the operation-assured voltage of the control unit, and is equal to or greater than the start voltage to start the operation of the control unit.

In accordance with the invention, since an initialization signal is continuously output to the control unit during the period of time that the voltage fed to the control unit is equal to or less than the operation-assured voltage of the control unit, and is equal to or greater than the start voltage to start the operation of the control unit, the initialization routine is executed when the control unit begins operation, and abnormal control routines by the control unit can be avoided.

An electronic apparatus according to a second aspect of the present invention is the apparatus of the first aspect wherein the continuous initialization device continuously outputs an initialization signal to the control unit when the voltage fed to the control unit is equal to or greater than the lower limit of the operation-assured voltage of the peripheral circuits.

An electronic apparatus according to a third aspect of the present invention is the apparatus of the first or second aspects that further includes a charging control device to charge the rechargeable battery with power fed from the power supply, a voltage generation device to generate voltage by using the power supply, and a service voltage buildup device to build up voltage fed to the control unit on the basis of voltage obtained by adding the voltage generated by the voltage generation device and the voltage of the rechargeable battery, until the voltage of the rechargeable battery exceeds at least the operation-assured voltage of the control unit.

An electronic apparatus according to a fourth aspect of the present invention is the apparatus of the third aspect that further includes an abnormality detector to detect abnormalities in the control unit, wherein the continuous initialization device furthermore continuously outputs an initialization signal to the control unit when an abnormality has occurred in the control unit on the basis of the detection results of the abnormality detector.

An electronic apparatus according to a fifth aspect of the present invention is the apparatus of the fourth aspect, wherein the service voltage buildup device furthermore builds up voltage fed to the control unit on the basis of voltage obtained by adding the voltage generated by the voltage generation device and the voltage of the rechargeable battery, when an abnormality has occurred in the control unit on the basis of the detection results of the abnormality detector.

According to a sixth aspect of the present invention an electronic apparatus is provided. The electronic apparatus has a control unit, peripheral circuits whose operations are controlled by the control unit, and a rechargeable battery to feed operation power to the control unit and the peripheral circuits. The rechargeable battery is charged by electricity fed from a power supply. The electronic apparatus has an abnormality detection device, a continuous initialization device, a voltage generation device, and a service voltage builtup device. The abnormality detection device detects abnormalities in the control unit. The continuous initialization device continuously outputs an initialization signal to the control unit when an abnormality has occurred in the control unit on the basis of the detection results of the abnormality detector. The voltage generation device generates voltage by using the power supply. The service voltage buildup device builds up voltage fed to the control unit on the basis of voltage obtained by adding the voltage generated by the voltage generation device and the voltage of the rechargeable battery, until the voltage of the rechargeable battery exceeds at least the operation-assured voltage of the control unit, when an abnormality has occurred in the control unit on the basis of the detection results of the abnormality detector.

In accordance with sixth aspect of the present invention, when an abnormality occurs in the control unit, an initialization signal is continuously output to the control unit, voltage is generated by using the supply of power from the power supply, and the supply of voltage to the control unit is built up on the basis of voltage obtained by adding the generated voltage and the voltage of the rechargeable battery. Therefore, the control unit is made to execute the initialization routine even if an abnormality occurs in the control unit, and the abnormal control routines of the control unit can be rapidly and reliably halted.

An electronic apparatus according to a seventh aspect of the present invention is the apparatus of any one of the first to sixth aspects, wherein the peripheral circuits have an oscillation circuit to output a clock signal, and a clock control device to switch-control the feeding and suspension of the clock signal to the control unit. Further, the clock control device stops feeding the clock signal to the control unit when the control unit has executed a control unit halt command, and starts feeding the clock signal to the control unit when the peripheral circuits issue an interrupt to the control unit, or when the continuous initialization device begins outputting an initialization signal.

An electronic apparatus according to an eighth aspect of the present invention is the apparatus of any one of the first to seventh aspects, wherein the peripheral circuits are provided with a timing device to measure time, and the electronic apparatus is configured as a clock equipped with a time display device to display time on the basis of the timing results of the timing device.

A ninth aspect of the present invention provides a control method for an electronic apparatus having a control unit, peripheral circuits whose operations are controlled by the control unit, and a rechargeable battery to feed operation power to the control unit and the peripheral circuits. Further, an initialization signal is continuously output to the control unit during the period of time that the voltage fed to the control unit is equal to or less than the operation-assured voltage of the control unit, and is equal to or greater than the start voltage for starting the operation of the control unit.

A tenth aspect of the present invention provides a control method for an electronic apparatus having a control unit, peripheral circuits whose operations are controlled by the control unit, and a rechargeable battery to feed operation power to the control unit and the peripheral circuits. The rechargeable battery is charged by electricity fed from a power supply. Further, a determination is made whether an abnormality has occurred in the control unit, and when an abnormality has been detected, an initialization signal is continuously output to the control unit, voltage is generated by the power supply, and the voltage fed to the control unit is built up on the basis of voltage obtained by adding the generated voltage and the voltage of the rechargeable battery.

In accordance with the present invention, abnormal control routines of the control unit can be avoided, or the abnormal control routines of the control unit can be rapidly halted. Cases can be avoided in which an abnormal control routine of the control unit continues, circuits not expected to operate suddenly begin to operate, and power is wasted.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
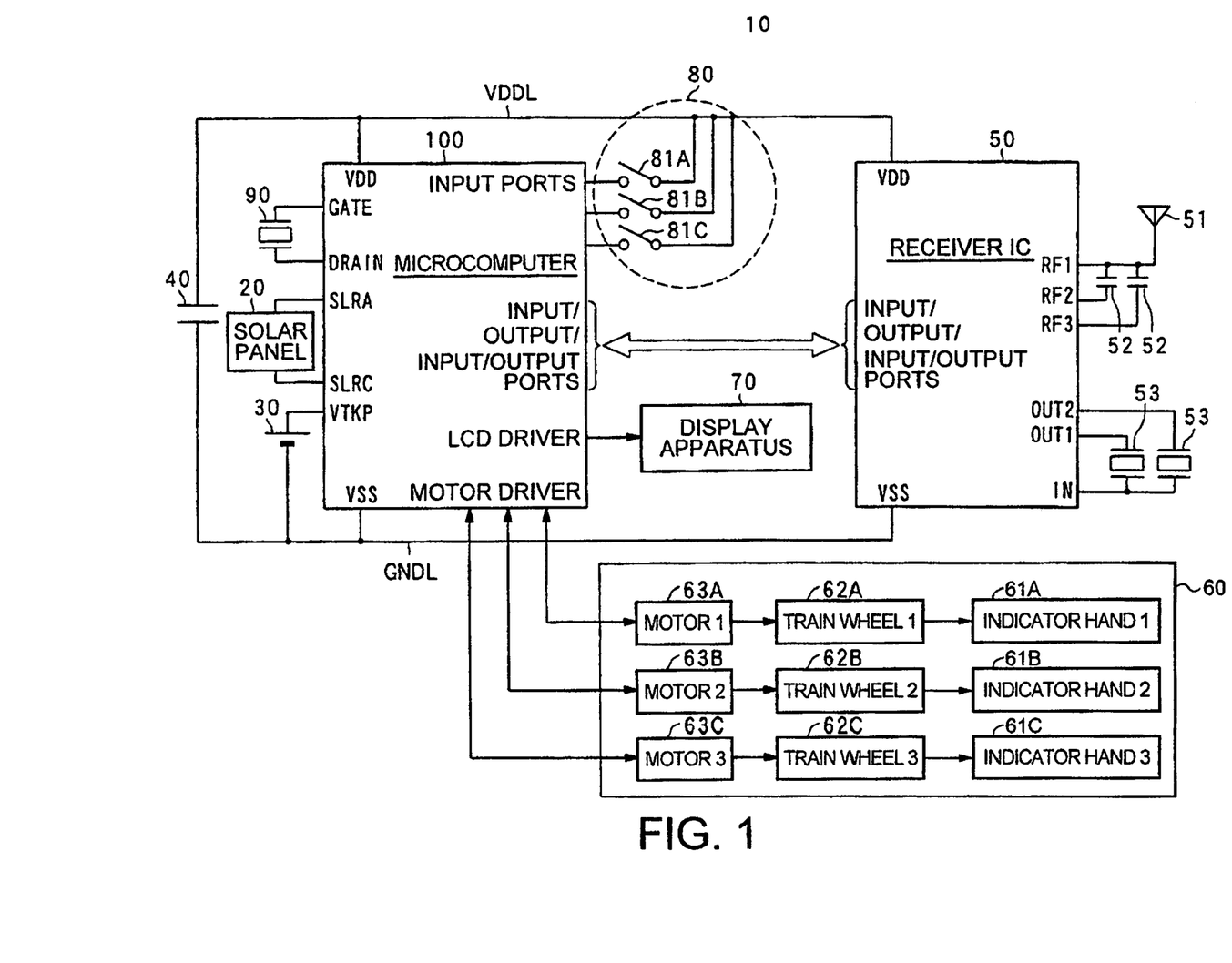
FIG. 1 is a view of a block diagram illustrating the schematic configuration of a solar rechargeable radio wave clock of an electronic apparatus in accordance with a first preferred embodiment of the present invention.

FIG. 1 is a view of a block diagram showing the schematic configuration of a solar rechargeable radio wave clock 10 of an embodiment of the electronic apparatus of the present invention. The solar rechargeable radio wave clock (hereinafter referred to as "radio wave clock") 10 is provided with a microcomputer 100. A solar panel (power supply) 20, a secondary storage battery (rechargeable battery) 30, a power capacitor 40, a receiver IC 50, a clock display apparatus (clock display device) 60, a display device 70, a operation detector 80, a quartz vibrator 90, and other components are connected to the microcomputer 100. The solar panel 20 generates electricity from solar light or other light, and feeds the generated power to the VTKP and VSS terminals of the microcomputer 100.

The secondary storage battery 30 is a rechargeable battery that supplies operation power to the components of the radio wave clock 10, is connected to the VTKP and VSS terminals of the microcomputer 100, and is charged by the microcomputer 100 with the electricity generated by the solar panel 20. The power stored in the secondary storage battery 30 is fed to the high-potential line VDDL and the low-potential line GNDL by way of the VDD and VSS terminals of the microcomputer 100. The power capacitor 40 is disposed between the VDD and VSS terminals of the microcomputer 100, and functions as a voltage stabilizing capacitor that stabilizes the voltage applied between the terminals, that is to say, the high-potential line VDDL and the low-potential line GNDL.

The receiver IC (receiving device) 50 is connected to the input, output, and input/output ports of the microcomputer 100, receives long wave standard radio waves (Japan JJY: 40 kHz/60 kHz, US WWVB: 60 kHz, Germany DCF77: 77.5 kHz) via an antenna 51, and outputs to the microcomputer 100 time information contained in the received long wave standard radio waves. A synchronizing capacitor 52 and an oscillator 53 are wire-connected to the receiver IC 50.

The clock display apparatus 60 is configured with a second pointer (indicator hand 1) 61A, a minute pointer and an hour pointer (indicator hand 2) 61B, a date indication unit (indicator hand 3) 61C, which is a date display board or a date display pointer, geared train wheels (train wheels 1 to 3) 62A to 62C to rotate the indictor 61A to 61C, and motors 63A to 63C to drive the geared train wheels 62A to 62C. The clock display apparatus 60 functions as a time display device that displays the time and date. The clock display apparatus 60 drives the motors 63A and 63C under the control of the microcomputer 100 to display the current time, and is corrected to the time that matches the time information received via the receiver IC 50.

The display device 70 displays various information (lap time, for example), and a liquid crystal display panel may be used. The display device 70 may be caused to function as a time display device that displays the time and date.

The operation detector 80 is provided with operating switches 81A to 81C that switch ON and OFF in accordance with operation of the operation knob (operation button, crown, or the like) provided to the radio wave clock 10, one end of the operating switches 81A to 81C is connected to the high potential line VDDL, and the other end is connected to the input port of the microcomputer 100. Therefore, the voltage of the high potential line VDDL is applied to the input port to which the operating switch is connected when any one of the operating switches 81A to 81C is switched ON, and operation of the operating elements is detected by the microcomputer 100.

Figure 2:
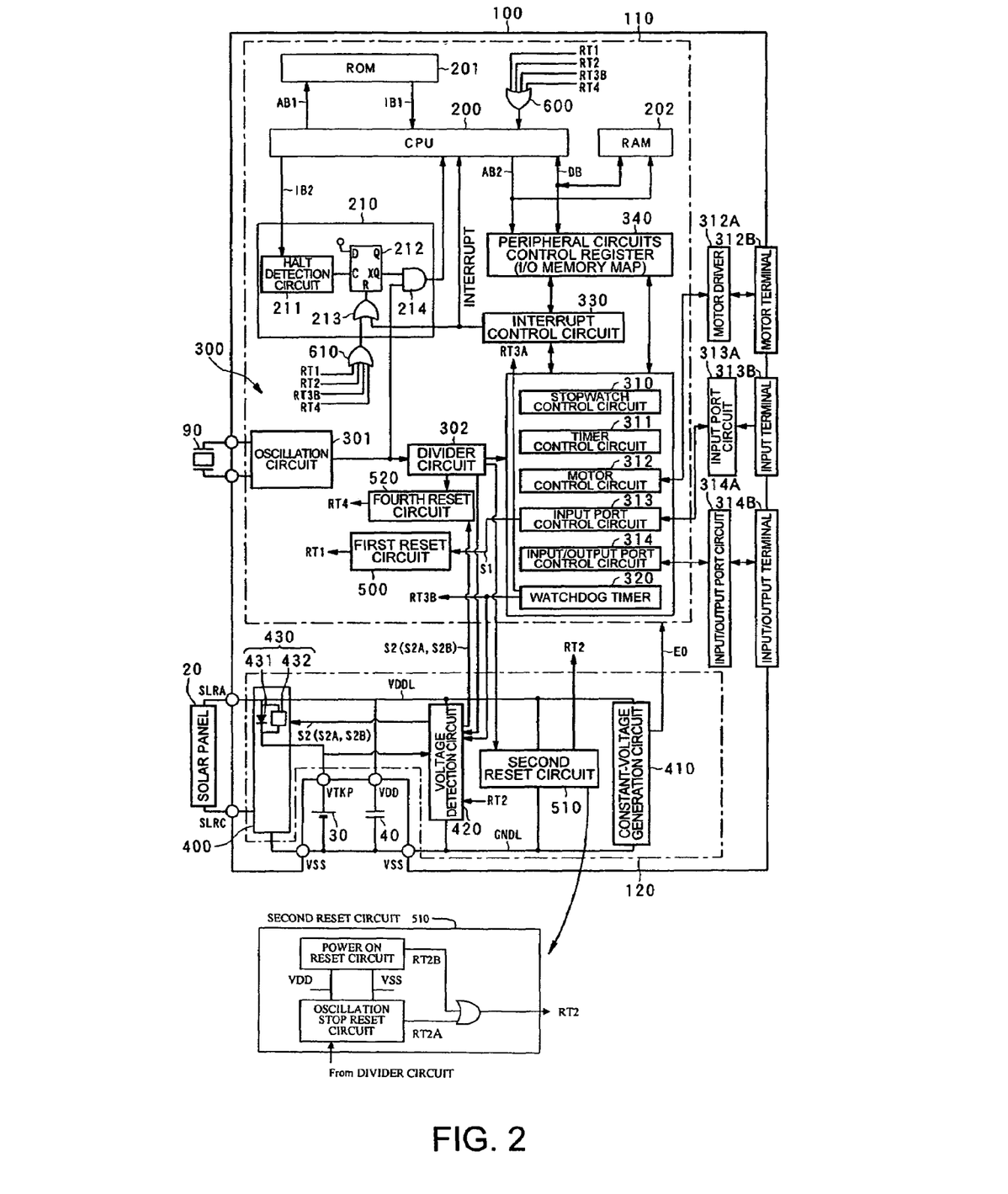
FIG. 2 is a view of a block diagram illustrating the configuration of a microcomputer of the electronic apparatus.

FIG. 2 is a view of a block diagram showing the configuration of the microcomputer 100.

The microcomputer 100 is composed of a constant voltage driver circuit 110, and a power supply control circuit 120 that feeds power E0 stored in the secondary storage battery 30 to the constant voltage driver circuit 110.

The constant voltage driver circuit 110 is composed of a CPU (control unit) 200 that operates on the power E0, a ROM 201, a RAM 202, and peripheral circuits 300.

In the configuration of the constant voltage driver circuit 110, the group of circuits (oscillation circuit 301, divider circuit 302, and other circuits) excluding the CPU 200, ROM 201, and RAM 202 are collectively referred to as peripheral circuits 300, and nearly all of the circuits are circuits that can operate normally at a lower voltage V2 than the operation-assured voltage V1 of the CPU 200.

Described for the sake of convenience in the present embodiment is the case in which the lower limit of the operation-assured voltage V1 of the CPU 200, ROM 201, and RAM 202 is 0.9 V, and the lower limit of the operation-assured voltage V2 that ensures the operation of the peripheral circuits 300 is 0.6 V.

In the constant voltage driver circuit 110, the oscillation circuit 301 outputs a signal with a frequency (32 kHz) determined by the quartz vibrator 90 connected to an external terminal without regard to whether the CPU 200 is currently operating or currently halted, and feeds the signal to the divider circuit 302, clock control circuit 210, and other circuits. The divider circuit 302 divides the clock signal input from the oscillation circuit 301, and feeds the divided signal (pulse) with a prescribed frequency to the stopwatch control circuit 310, timer control circuit (timing device) 311, motor control circuit 312, input port control circuit 313, input/output port control circuit 314, watchdog timer 320, power supply control circuit 120, and other components.

The stopwatch control circuit 310 is a counter that counts pulses with a prescribed frequency, starts or stops the counting operation on the basis of flag information or other information stored in a prescribed area of a peripheral circuit control register 340, and during counting, outputs an interrupt signal to the interrupt control circuit 330 in $1/100$, $1/10$, and 1 second intervals irrespective of whether the CPU 200 is currently operating or currently halted. The count content of the stopwatch control circuit 310 is displayed in the display device 70 by an LCD driver (not shown).

The timer control circuit 311 is a counter that counts pulses with a prescribed frequency, starts or stops the counting operation on the basis of the flag information or other information stored in a prescribed area of the peripheral circuit control register 340, and outputs an interrupt signal to the interrupt control circuit 330 in each drive cycle (1 second) of the clock display apparatus 60, for example, irrespective of whether the CPU 200 is currently operating or currently halted.

The motor control circuit 312 controls the motor driver 312A and outputs a drive signal on the basis of information or other data stored in the prescribed area of a peripheral circuit control register 340. Further, the motor driver 312A feds a drive pulse to the motors 63A to 63C that are connected to the motor terminals 312B to drive rotatably the motors 63A to 63C.

The input port control circuit 313 accepts data regarding opening or closing of the operating switches 81A to 81C connected to the input terminals 313B via an input port circuit 313A, and an interrupt signal corresponding to the accepted data is output to the interrupt control circuit 330. The input port control circuit 313 also outputs a signal S1 to direct operation startup to a first reset circuit 500 in the case that the accepted data are data that indicates a predetermined reset operation (simultaneous operation of a plurality of operating buttons, for example)

The input/output port control circuit 314 controls, on the basis of flag information or other information stored in a prescribed area of the peripheral circuit control register 340, the state of the circuits connected to the input/output terminal 314B via the input/output terminal 314A; outputs a signal that controls the receiver IC 50; provides an output to the interrupt control circuit 330 in cases such as when a transmitted signal (received data or other data) from the receiver IC 50 is input; and stores the received data in the peripheral circuit control register 340 without passing through the interrupt control circuit 330.

The watchdog timer 320 is a counter that counts pulses with a prescribed frequency (256 Hz, for example), starts or stops the counting operation on the basis of flag information or other information stored in a prescribed area of the peripheral circuit control register 340, and during counting, outputs an interrupt signal RT3A to the interrupt control circuit 330 when the system has not been reset for 3 to 4 seconds or more, and also outputs a reset signal RT3B.

The CPU 200 periodically performs a reset operation by software while the watchdog timer 320 is operating. Therefore, when the CPU 200 is operating normally, the watchdog timer 320 is periodically reset, the signals RT3A and RT3B are not output from the watchdog timer 320, and only when an abnormality occurs in the CPU200 and a reset is not performed are the signals RT3A and RT3B output. More specifically, the watchdog timer 320 functions as an abnormality detector or detection device that detects abnormalities in the CPU 200.

The interrupt control circuit 330 accepts interrupt signals from the stopwatch control circuit 310, timer control circuit 311, motor control circuit 312, input port control circuit 313, input/output port control circuit 314, and watchdog timer 320. Further, the interrupt control circuit 330 selectively outputs interrupt signals on the basis of information (information showing the priority level of the interrupt) written in a prescribed area of the peripheral circuit control register 340.

The ROM 201 stores programs for timing operations, component control, and other purposes, and sends program data written in a specified address to an instruction bus IB1 via an address bus AB1.

The RAM 202 stores in a prescribed area the current time, timing data of the stopwatch control circuit 310, and other data. The address of the RAM 202 is specified by the address bus AB2. By means of a send command or write command, data stored in the specified address are sent to the data bus DB, or the data sent via the data bus DB are written in the specified address.

Since the CPU 200 interprets the command code sent from the ROM 201 by way of the instruction bus IB1 and executes the operation that corresponds to the command, information is written to the peripheral circuit control register 340, and the written information controls the operation of the stopwatch control circuit 310, timer control circuit 311, motor control circuit 312, input port control circuit 313, input/output port control circuit 314, and watchdog timer 320. When an interrupt signal is input from the interrupt control circuit 330, the program data (command code, other data) that correspond to the interrupt signal are sent from the ROM 201 to the instruction bus IB1, and the peripheral circuits 300 are controlled so that the corresponding operations are carried out in a sequential fashion.

In this case, when a "HALT" command (which is a CPU 200 halt command to set the CPU 200 in a standby state) is sent as a command code to be executed by the CPU 200, the CPU 200 executes the "HALT" command, sends the "HALT" command code to the instruction bus IB2, and thereafter switches to a HALT state in which solely the CPU 200 stops operation. In this HALT state, the CPU 200 alone stops operation, and the oscillation circuit 301, timer control circuit 311, and other peripheral circuits 300 continue to operate. The content of the RAM 202 is retained during the HALT state in the condition that exists when the HALT command is executed.

The clock control circuit (clock control device) 210 is a circuit that switch-controls the feeding and suspension of the clock signal to the CPU 200, and is composed of a HALT detection circuit (HALT detection device) 211, flip-flop 212, OR circuit 213, AND circuit 214, and other circuits. The HALT detection circuit 211 interprets the code sent by way of the instruction bus IB2, detects whether the command code is a "HALT" command, and outputs a detection signal (rising signal) to the input C of the flip-flop 212 when the command code is a "HALT" command. The HALT detection circuit 211 may detect whether the code sent by way of the instruction bus IB1 is a "HALT" command code.

The flip-flop 212 is configured so that a high (H) level signal is input to the input D. Therefore, when a reset input is input to the input R, the output level of the output XQ of the flip-flop 212 is kept at a high level, and when a detection signal is input to the input C, the output level of the output XQ is kept at a low (L) level with the rise timing of the detection signal.

The OR circuit 213 accepts an interrupt signal and the output of a hereinafter-described OR circuit 610.

In the AND circuit 214, the output signal of the output XQ of the flip-flop 212 is presented to one of the inputs, and the clock signal from the oscillation circuit 301 is presented to the other input.

Therefore, when reset input is presented to the flip-flop 212, the output level of the output XQ kept at a high level, and a clock signal is fed from the AND circuit 214 to the CPU 200. When the HALT detection circuit 211 conversely detects that a "HALT" command has been executed by the CPU 200, the output level of the output XQ is kept at a low level, and a clock signal is not output from the AND circuit 214. The clock signal feed to the CPU 200 is thereby stopped.

Since the configuration provides for an interrupt signal to be input to the OR circuit 213, when an interrupt to the CPU 200 is generated, the flip-flop 212 is reset and the clock signal is fed to the CPU 200. Therefore, when an interrupt is generated by the peripheral circuits 300, the HALT state can be released and the CPU 200 can start a routine that corresponds to the interrupt, in the same manner as in the prior art.

Thus, when the CPU 200 executes a "HALT" command, the operation of circuits in the CPU 200 can be completely halted by stopping the clock signal feed to the CPU 200, and the wasteful use of power during a "HALT" command can be avoided in comparison with the prior art.

The power supply control circuit 120 is described next.

The power supply control circuit 120 is configured with a charging control circuit 400, a constant voltage generation circuit 410, and a constant voltage detection circuit 420.

The charging control circuit 400 is a circuit provided to charge the secondary storage battery 30 by using power generated by the solar panel 20. In the present embodiment, the charging control circuit 400 uses power generated by the solar panel 20, and is provided with a quick start circuit (service voltage buildup device) 430 to build up the voltage applied between the high potential line VDDL connected to the VDD terminal and the low-potential line GNDL connected to the VSS terminal, more specifically, the voltage fed to the constant voltage generation circuit 410.

The quick start circuit 430 is composed of a diode (voltage generation device) 431 interposed between the positive side (VTKP terminal) of the secondary storage battery 30 and the positive side (SLRA terminal) of the solar panel 20, and a transistor switch (switch device) 432 that functions as a bypass circuit for the diode 431, as shown in FIG. 2.

The quick start circuit 430 controls the ON/OFF state of the transistor switch 432 on the basis of the instruction signal S2 input from the constant voltage detection circuit 420, and uses the voltage that matches the voltage VA of the secondary storage battery 30 for the service voltage for the constant voltage generation circuit 410 when transistor switch 432 is switched ON.

The quick start circuit 430 allows current generated by the solar panel 20 to flow to the diode 431, generates a forward voltage VB brought about by the internal resistance of the diode 431, and uses as the voltage fed to the constant voltage generation circuit 410 the voltage (VA+VB) obtained by adding the forward voltage VB and the voltage VA of the secondary storage battery 30.

Hereinafter, the period of time that the transistor switch 432 is switched OFF will be described as "quick start time period TS." The diode 431 is not limited to a single diode, and a plurality of diodes may be used. Further, resistors, capacitors, or transistors may be used in place of the diode 431.

The constant voltage generation circuit 410 generates a constant voltage (0.95 V) that assures the normal operation of the CPU 200 and peripheral circuits 300 by using the voltage applied between the high potential line VDDL and the low-potential line GNDL, and the power E0 of the voltage is fed to the constant voltage driver circuit 110.

However, when the voltage applied between the high potential line VDDL and the low-potential line GNDL, more specifically, the voltage VA of the secondary storage battery 30, is insufficient (less than 0.95 V, for example) to produce 0.95 V, the constant voltage generation circuit 410 cannot generate a voltage of 0.95 V, and a voltage that is 0.95 V or less is produced. In this case, when the voltage of the power E0 fed to the constant voltage driver circuit 110 is less than the operation-assured voltage V1 (0.9 V) of the CPU 200 and equal to or greater than the operation-assured voltage V2 (0.6 V) of the peripheral circuits 300, the peripheral circuits 300 can operate normally, but the operation of the CPU 200 is not assured, and when the voltage with the supplied power E0 is less than the operation-assured voltage V2 (0.6 V) of the peripheral circuits 300, the operation of the CPU 200 and peripheral circuits 300 is stopped.

The constant voltage detection circuit 420 is a circuit that detects the voltage VA of the secondary storage battery 30, and outputs a signal S2 that directs the quick start circuit 430 to start or end the quick start time period TS, in other words, a signal that directs the transistor switch 432 to switch ON or OFF in accordance with the voltage VA of the secondary storage battery 30.

In the radio wave clock 10, a plurality of reset circuits are provided for outputting a reset signal (initialization signal) RT that directs the CPU 200 to initialize. The reset circuits are described below.

The first reset circuit is first reset circuit 500. The first reset circuit 500 is a circuit that outputs the reset signal RT1 each instance that the signal S1 to direct operation to start is input from the input port control circuit 313. Therefore, when the user has performed a reset operation, a reset signal (initialization signal) RT1 is output to the CPU 200, and an initialization routine is executed by the CPU 200.

The second reset circuit is second reset circuit 510. The second reset circuit 510 is a circuit that outputs a reset signal RT2 when the operation of the oscillation circuit 301 has been started or stopped, and is composed of an oscillation stop reset circuit that outputs a reset signal RT2A to detect that an output signal from the divider circuit 302 is no longer being input, and a power ON reset circuit that outputs a reset signal RT2B. The oscillation stop reset circuit and the power ON circuit may be configured with a time constant circuit.

Therefore, when the voltage VA of the secondary storage battery 30 is below a prescribed voltage that is less than or equal to the operation-assured voltage V2 (0.6) of the peripheral circuits 300 (oscillation circuit 301), or is above a prescribed electrical potential in the vicinity of the operation-assured voltage V2, the reset signals RT2A and RT2B are output and the CPU 200 executes an initialization routine.

The third reset circuit is the watchdog timer 320 described above. More specifically, the watchdog timer 320 outputs a reset signal RT3B to the CPU 200 when the reset operation that should have been executed by the CPU 200 does not take place within a prescribed length of time (3 to 4 seconds). When an abnormality occurs in the CPU 200, a reset signal (initialization signal) RT3B is output and an initialization routine is executed by the CPU 200.

The fourth reset circuit is fourth reset circuit (continuous initialization device) 520. The fourth reset circuit 520 starts an operation that decodes and outputs a plurality of different frequency signals that are input from the divider circuit 302 in correspondence with the signal S2 from the constant voltage detection circuit 420, and is a circuit that outputs a signal in which the signal level rises for a short period of time in each prescribed cycle (between 0.5 and 20 seconds), that is to say, outputs a reset signal (initialization signal) RT4 in each prescribed cycle during operation.

In this configuration, the reset signals RT2 and RT3B from the second reset circuit 510 and watchdog timer 320 are input to the constant voltage detection circuit 420, and the constant voltage detection circuit 420 outputs a signal S2 (S2A) that directs the quick start time period TS to start up when either one of the reset signals RT2 or RT3B are input. Thereafter, when the voltage VA of the secondary storage battery 30 exceeds the preset voltage (1.0 V) for allowing the secondary storage battery 30 to be sufficiently charged, the signal S2 (S2B) is output to direct that the quick start time period TS be ended.

The signal S2 that is output by the constant voltage detection circuit 420 is also output to the fourth reset circuit 520, and the output of the reset signal RT4 is stopped when the fourth reset circuit 520 inputs a signal S2A (which directs the start of the quick start time period TS) as a signal that directs operation startup, continuously outputs a reset signal RT4 to the CPU 200 in accordance with the timing by which the signal has been input, and inputs the signal S2B to direct the end of the quick start time period TS.

Therefore, when the voltage VA of the secondary storage battery 30 falls below the prescribed voltage, which is less than or equal to the operation-assured voltage V2 (0.6 V) of the peripheral circuits 300 (oscillation circuit 301), or exceeds a prescribed electrical potential in the vicinity of the operation-assured voltage V2, the reset signal RT4, in addition to the reset signal RT2, is continuously output to the CPU 200 until the voltage VA of the secondary storage battery 30 exceeds the set voltage (1.0 V).

The reset signal RT1 is furthermore input from the first reset circuit 500 to the constant voltage detection circuit 420, and the signal S2A directing the startup of the quick start time period TS may be output, even when the reset signal RT1 is input.

The reset signals RT1, RT2, RT3B, and RT4 are input to the OR circuit 600, as shown in FIG. 2, and the output of the OR circuit 600 is fed to the reset terminal of the CPU 200. When any of the reset signals RT1 to RT4 are output, a reset signal is input to the reset terminal of the CPU 200, and the CPU 200 executes an initialization routine.

The reset signals RT1, RT2, RT3B, and RT4 are input to the OR circuit 610, and the output of the OR circuit 610 is input to the OR circuit 213 in the clock control circuit 210. When any of the reset signals RT1 RT2, RT3B, and RT4 are output, the flip-flop 212 of the clock control circuit 210 is reset. This reset operation can return the system to an initial state that provides clock signal to the CPU 200.

The operation of the radio wave clock 10 is described next.

First, when the voltage VA of the secondary storage battery 30 reaches a level that is equal to or less than the operation-assured voltage V2 of the peripheral circuits 300 in the radio wave clock 10, a routine that sets the transistor switch 432 of the quick start circuit 430 in an OFF state (routine for setting the state that allows a quick start) and a routine that sets the fourth reset circuit 520 in an operating state are carried out.

More specifically, when the voltage VA of the secondary storage battery 30 reaches a level that is equal to or less than the operation-assured voltage V2, the operation of the oscillation circuit 301 and other circuits is no longer stable, the oscillation circuit. 301 and other circuits stop operation, and when operation thereof stops, a reset signal RT2 is output from the second reset circuit 510. For this reason, the transistor switch 432 of the quick start circuit 430 is set in an OFF state, and the fourth reset circuit 520 is brought to an operating state by the constant voltage detection circuit 420 to which the reset signal RT2 is input.

Figure 3:
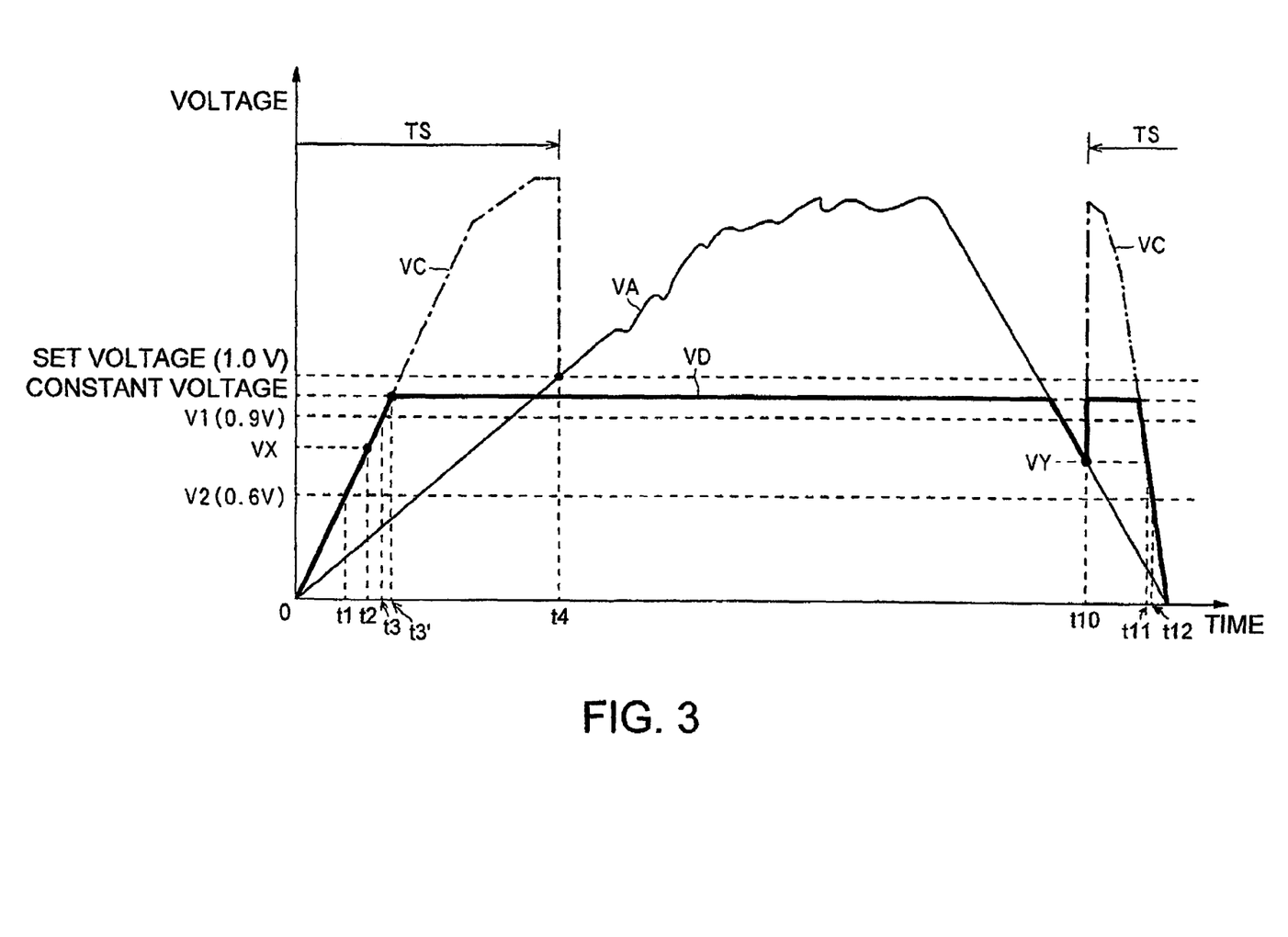
FIG. 3 is a view of a diagram outlining the operation of the microcomputer.
Figure 4:
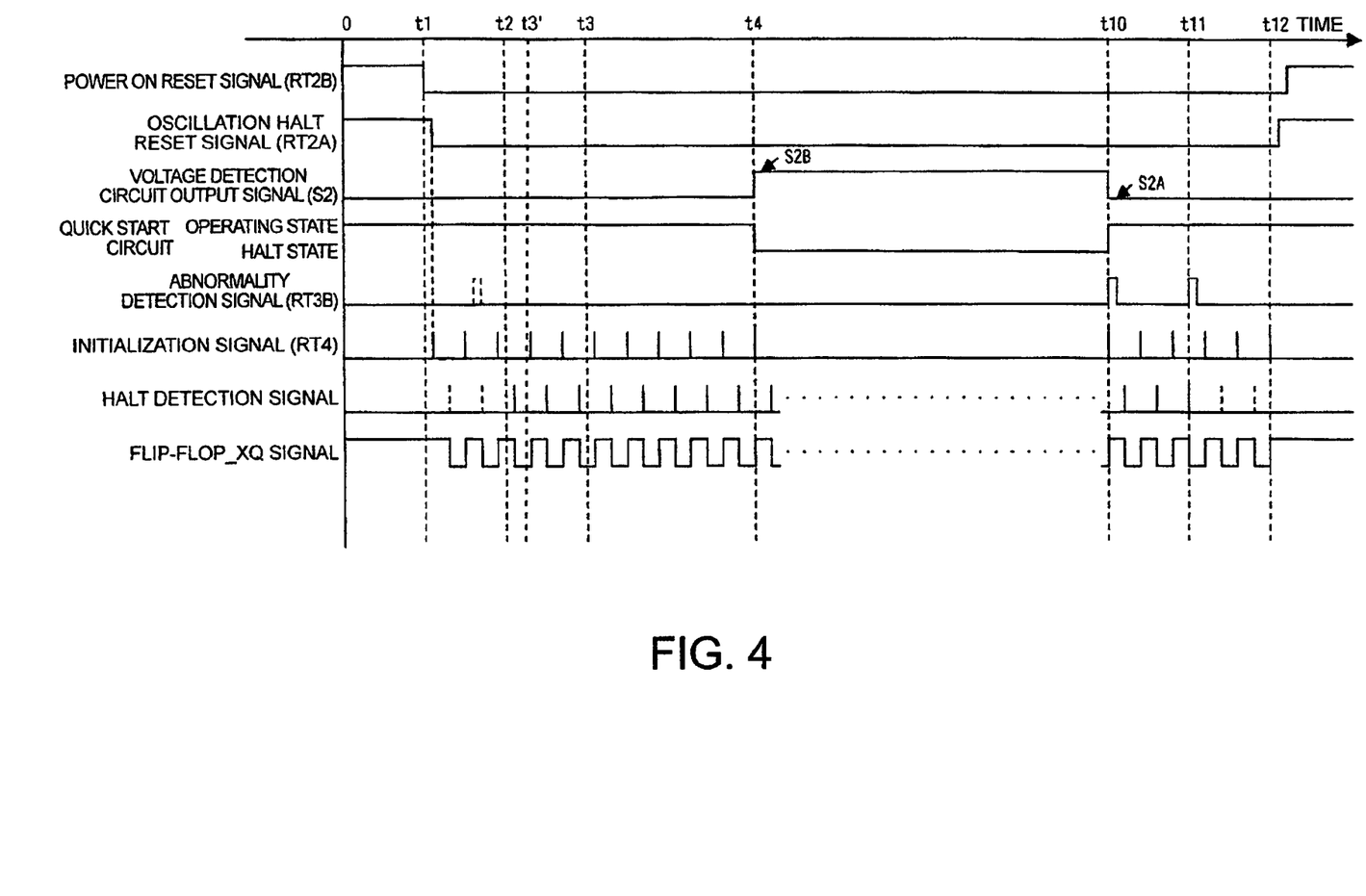
FIG. 4 is a view of a timing chart describing the operation of the microcomputer.

FIG. 3 is a view of a diagram showing the time variation of the voltage VA when the secondary storage battery 30 is charged from a substantially completely discharged state, and FIG. 4 is a view of a diagram showing an example of a timing chart for such a case. In FIG. 3, the symbol VC shows the voltage (VDD) of the power capacitor 40, and the symbol VD (solid bold line in the diagram) shows the service voltage (service voltage for the CPU 200 and peripheral circuits 300) for the constant voltage driver circuit 110. Operation of the CPU 200 and peripheral circuits 300 is completely stopped in a state in which the secondary storage battery 30 is discharged.

When the solar panel 20 is in a power-generating state, as shown in FIG. 3, the voltage (VA+VB) obtained by adding the forward voltage VB of the diode 431 and the voltage VA of the secondary storage battery 30 is applied to the power capacitor 40 because the transistor switch 432 of the quick start circuit 430 is in the OFF state.

Since the voltage VC of the power capacitor 40 is applied to the constant voltage generation circuit 410, the voltage VD (which matches the operating voltage VC at this stage) fed to the constant voltage driver circuit 110 is equal to or higher than the operation-assured voltage V2 of the peripheral circuits 300, and the operation of the oscillation circuit 301 and other peripheral circuits 300 is started early at time t1, even if the voltage VA of the secondary storage battery 30 is still equal to or less than the operation-assured voltage V2. Together with the operation start of the peripheral circuits 300, the reset signal RT2B from the power ON reset circuit in the second reset circuit 510 changes from a high level to a low level at time t1, as shown in FIG. 4, and after a prescribed period of time, the reset signal RT2A from the oscillation stop reset circuit in the second reset circuit 510 changes from a high level to a low level, and the reset signal RT4 is output from the fourth reset circuit 520 at each prescribed cycle. Since the reset signals RT2 (RT2A and RT2B) and RT4 are input to the reset terminal of the CPU 200, the CPU 200 executes an initialization routine when the CPU 200 is in an operable state. The case described in the present embodiment is one in which the CPU 200 does not operate normally, and the CPU 200 has not executed an initialization routine because the voltage (voltage VD) fed to the CPU 200 is lower than the start voltage VX (described below) at the time that the reset signal RT2 is input to the CPU/200.

When the reset signal RT4 is output, the flip-flop 212 of the clock control circuit 210 is reset, the clock signal feed to the CPU 200 is started, and the reset signal RT4 is periodically fed to the reset terminal of the CPU 200.

For this reason, the voltage VA of the secondary storage battery 30 gradually increases. Further, even if the voltage VD (which matches the operating voltage VC at this stage) fed to the constant voltage driver circuit 110 matches the lower limit of the operation-assured voltage V1 of the CPU 200, or is lower than the operation-assured voltage V1, the CPU 200 begins operating when the voltage exceeds the level (hereinafter referred to as start voltage VX) that allows the CPU 200 to operate (time t2). When the CPU 200 begins operating, an initialization routine is reliably executed because the reset signal RT4 is continuously input to the CPU 200.

The initialization routine is therefore immediately executed before the CPU 200 begins abnormal control routines or even if abnormal control routines have already started, and the situation can be avoided in which peripheral circuits 300 no longer operate normally due to the abnormal control of the CPU 200.

Here, a routine to direct the watchdog timer 320 to start operation is written in the ROM 201 as a routine that the CPU 200 executes after the initialization routine is executed, and after the CPU 200 has executed the initialization routine, the watchdog timer 320 is brought to an operating state. In the example shown in FIG. 4, the CPU 200 executes an initialization routine on the basis of the reset signal RT4, and the diagram shows the case in which the HALT detection circuit 211 detects that the CPU 200 is executing a "HALT" command before reaching time t2, and since the voltage (voltage VD) fed to the CPU 200 is lower than the start voltage VX, the CPU 200 does not operate normally, and the reset signal RT3B is output from the watchdog timer 320 to the CPU 200 due to the abnormal operation.

Next, when the time t3 arrives, the voltage VD (which matches the operating voltage VC at this stage) fed to the constant voltage driver circuit 110 reaches the operation-assured voltage V1 of the CPU 200, and when the time t3' arrives, the reset signal RT4 is continuously input to the CPU 200 even if the service voltage VD (which matches the operating voltage VC at this stage) reaches a voltage that allows a constant voltage (0.95 V) set in the constant voltage generation circuit 410 to be generated. For this reason, the CPU 200 continuously executes an initialization routine and is prevented from executing routines other than an initialization routine. Therefore, when the secondary storage battery 30 is in an inadequately charged state (voltage VA of the secondary storage battery 30 is 1.0 V or less in the present embodiment), the situation can be avoided in which the CPU 200 performs an abnormal control routine, and power is wastefully consumed by unexpected circuit operation.

Next, at the time t4, when the voltage VA of the secondary storage battery 30 exceeds a preset voltage that allows a determination whether the secondary storage battery 30 is sufficiently charged, that is to say, exceeds a set voltage (1.0 V) that allows the radio wave clock 10 to be adequately driven by the secondary storage battery 30 alone, a signal S2B (high level signal shown in FIG. 4) that directs the end of the quick start time period TS is output from the constant voltage detection circuit 420, the transistor switch 432 of the quick start circuit 430 is switched ON, and the fourth reset circuit 520 is caused to stop outputting the reset signal RT4 by the signal S2B.

The CPU 200 therefore switches from an initialization state to a normal routine at time t4 and thereafter, and begins to control the peripheral circuits 300. In this case, since the secondary storage battery 30 is adequately charged, the CPU 200 does not execute an abnormal control routine due to an insufficient supply of voltage, the CPU 200 can operate normally, and since a routine that periodically resets the watchdog timer 320 can be executed at, for example, time t4 and thereafter, the reset signal RT3B is not output from the watchdog timer 320 as long as the CPU 200 is operating normally.

Described next with reference to FIGS. 3 and 4 is the operation of the system in the case in which the charging speed of the secondary storage battery 30 cannot keep up with the power consumption of the CPU 200 and peripheral circuits 300, or in other cases in which the voltage VD (which matches the voltage VA of the secondary storage battery 30 at this stage) fed to the constant voltage driver circuit 110 has dropped to or below the operation-assured voltage V1 of the CPU 200 and other components.

The voltage VD (which matches the voltage VA of the secondary storage battery 30 at this stage) fed to the constant voltage driver circuit 110 is equal to or less than the operation-assured voltage V1 of the CPU 200 at time t10, and is equal to or greater than the operation-assured voltage V2 of the peripheral circuits 300. When a voltage (referred to as stop voltage VY) is reached whereby the operation of the CPU 200 stops or the CPU 200 begins abnormal operation, the reset signal RT3B is output from the watchdog timer 320 at time t10 because the watchdog timer 320 resetting routine carried out by the CPU 200 is not executed in a normal fashion.

When the reset signal RT3B is output, a signal S2A (low level signal shown in FIG. 4) to direct the start of the quick start time period TS is output from the constant voltage detection circuit 420 to which the reset signal RT3B has been input, the transistor switch 432 of the quick start circuit 430 is set in an OFF state, and the fourth reset circuit 520 is brought to an operating state.

For this reason, when the solar panel 20 is generating electricity, the voltage (VA+VB) obtained by adding the forward voltage VB of the diode 431 and the voltage VA of the secondary storage battery 30, that is, the voltage VC shown in FIG. 3, is applied to the power capacitor 40, as shown in FIG. 3, and the service voltage VD for the constant voltage driver circuit 110 builds up to a voltage (0.95 V in the example in FIG. 3) that is equal to or greater than the operation-assured voltage V1 of the CPU 200 and other components.

Therefore, the CPU 200 executes an initialization routine due to the reset signal RT3B output from the watchdog timer 320 and the reset signal RT4 continuously output from the fourth reset circuit 520, and abnormal control routines are not carried out, or even if abnormal control routines are performed, such control routines are immediately halted. When the service voltage VD for the constant voltage driver circuit 110 becomes equal to or less than the voltage VY at which the CPU 200 is inoperable (time t11), the CPU 200 stops operating, and when the voltage VD is equal to or less than the operation-assured voltage V2 of the peripheral circuits 300 (time t12), the operation of the oscillation circuit 301 and other peripheral circuits 300 is also stopped.

In a state in which the operation of the peripheral circuits 300 is stopped, conditions are maintained in which the transistor switch 432 of the quick start circuit 430 is set in an OFF state and in which the fourth reset circuit 520 is set in an operating state. Therefore, if the solar panel 20 is generating electricity, the voltage (VA+VB) obtained by adding the forward voltage VB of the diode 431 and the voltage VA of the secondary storage battery 30 is applied to the power capacitor 40, the operation of the oscillation circuit 301 and other peripheral circuits 300 is started early, and an initialization routine can be rapidly executed when the CPU 200 becomes operable.

Thus, in the present embodiment, the fourth reset circuit 520 is brought to an operating state prior to the service voltage VD for the CPU 200 reaching the start voltage VX when the service voltage VD for the CPU 200 builds up by charging from a state that is equal to or less than the start voltage VX at which the CPU 200 begins operation (the state of the first half of FIG. 3). Therefore, the reset signal RT4 is continuously output from the fourth reset circuit 520 when the service voltage VD is a voltage (which matches operation-assured voltage (lower limit) V2 of the peripheral circuits 300, or is in the vicinity thereof) that allows the fourth reset circuit 520 to operate.

Accordingly, since the CPU 200 becomes operable when the service voltage for the CPU 200 becomes equal to or greater than the start voltage VX, the CPU 200 executes an initialization routine, and cases in which the CPU 200 executes abnormal control routines can be avoided.

In the present embodiment, when the service voltage for the CPU 200 falls below the step voltage VY whereby the CPU 200 stops operating or begins abnormal control routines (the state of the latter half of FIG. 3), the reset signal RT4 is continuously output from the fourth reset circuit 520 because the watchdog timer 320 outputs the reset signal RT3.

Therefore, the CPU 200 can execute normal operations until an abnormality occurs, and the CPU 200 can also immediately execute an initialization routine that is timed with the occurrence of an abnormality in the CPU 200. Even if abnormal control routines are executed in the CPU 200, such control routines can thereby be rapidly stopped.

In the present embodiment, since the voltage (VA+VB) obtained by adding the forward voltage VB brought about by the diode 431 and the voltage VA of the secondary storage battery 30, that is, the voltage VC, is generated while the fourth reset circuit 520 performs the operation that outputs a reset signal RT4, voltage that is higher than the voltage VA of the secondary storage battery 30 can be used as service voltage VD for the CPU 200.

Therefore, even if the voltage VA of the secondary storage battery 30 is equal to or less than the operation-assured voltage (lower limit) V1 of the CPU 200, the service voltage VD for the CPU 200 can be rapidly made equal to or higher than the operation-assured voltage V1, and the CPU 200 can rapidly be caused to execute an initialization routine.

The embodiment described above shows only one aspect of the present invention, and any modification is possible within the scope of the invention. In the embodiment described above, the fourth reset circuit 520 was described for the case in which a reset signal RT4 is output at prescribed cycles during the operation, but also possible is a configuration in which an initialization signal is successively (continuously) output to the CPU 200 by keeping the output level at the reset level (high or low level) during operation.

The embodiment above described a case in which a solar panel 20 was applied as the power supply for feeding power to the radio wave clock 10, but devices that may be widely applied include a power generation device that provides an oscillating weight inside the radio wave clock 10 and generates electricity by the rotation of the oscillating weight (kinetic energy), a power generation device that generates power by thermoelectric production using the temperature difference (thermal energy) between one location and another, or an electromagnetic induction power generation device that receives broadcast radio waves, communication radio waves, or other free electromagnetic waves, and uses the energy to generate electricity.

The power supply is not limited to an electricity generating device and may also be an inductive charging device that feeds power to the radio wave clock 10 by electromagnetic induction through application of transformer principles, or a conductive charging device that feeds power to the radio wave clock 10 by terminal contact as an ordinary electrical connection method. This type of charging device can be configured as a charging stand that feeds power to the radio wave clock 10 when the radio wave clock 10 is disposed thereon, for example.

Exemplified in the above-described embodiment is the case in which the present invention is applied to a solar rechargeable radio wave clock, but wide application may also be made to electronic clocks that operate on a rechargeable battery, PDAs (Personal Digital Assistants), mobile telephones, microcomputers, and other electronic apparatuses that have a CPU.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An electronic apparatus having a control unit, peripheral circuits having operations controlled by said control unit, and a rechargeable battery being configured to feed operational power to said control unit and said peripheral circuits, said electronic apparatus comprising:
   a continuous initialization device configured to initialize said control unit; and
   a abnormality detector configured to detect abnormalities in said control unit,
   said continuous initialization device outputting an first initialization signal to said control unit during at least one of a first and a second periods of time, said first period of time being when voltage supplied to said control unit is equal to or less than operation-assured voltage of said control unit, and is equal to or greater than start voltage to start operation of said control unit, said second period of time being when said voltage supplied to said control unit is greater than the lower limit of operation-assured voltage of said peripheral circuits and lower than said start voltage to start said operation of said control unit,
   said continuous initialization device outputting a second initialization signal to said control unit when an abnormality is detected at said control unit.

2. The electronic apparatus according to claim 1, wherein the continuous initialization device outputs a third initialization signal to said control unit when the voltage fed to said control unit is equal to or greater than the lower limit of operation-assured voltage of said peripheral circuits.

3. The electronic apparatus according to claim 1, further comprising
   a charging control device to charge said rechargeable battery with power fed from said power supply,
   a voltage generation device to generate voltage by using said power supply, and
   a service voltage buildup device to accumulate voltage supplied to said control unit on the basis of voltage obtained by adding the voltage generated by said voltage generation device and the voltage of said rechargeable battery, until the voltage of said rechargeable battery exceeds at least the operation-assured voltage of said control unit.

4. The electronic apparatus according to claim 3, wherein said service voltage buildup device further accumulates voltage fed to said control unit on the basis of voltage obtained by adding the voltage generated by said voltage generation device and the voltage of said rechargeable battery, when said abnormality detector detects an abnormality in said control unit.

5. The electronic apparatus according to claim 4, wherein said peripheral circuits include
   an oscillation circuit outputting a clock signal, and
   a clock control device to switch-control feeding and suspension of the clock signal to said control unit, wherein said clock control device stops feeding the clock signal to said control unit when said control unit has executed a control unit halt command, and starts feeding said clock signal to said control unit when said peripheral circuits issue an interrupt to said control unit, or when said continuous initialization device begins outputting said first or second initialization signal.

6. The electronic apparatus according to claim 5, wherein said peripheral circuits are provided with a timing device to measure time, and the electronic apparatus is configured as a clock equipped with a time display to display time on the basis of the timing results of said timing device.

7. The electronic apparatus according to claim 2, wherein said peripheral circuits are provided with a timing device to measure time, and the electronic apparatus is configured as a clock equipped with a time display to display time on the basis of the timing results of said timing device.

8. A control method for an electronic apparatus having a control unit, peripheral circuits having operations controlled by the control unit, and a rechargeable battery for feeding operation power to the control unit and the peripheral circuits, said method comprising:
   outputting a first initialization signal to the control unit during at least one of a first and a second periods of time, said first period of time being when voltage fed to the control unit is equal to or less than operation-assured voltage of the control unit, and is equal to or greater than start voltage for starting the operation of the control unit, said second period of time being when said voltage supplied to said control unit is greater than the lower limit of operation-assured voltage of said peripheral circuits and lower than said start voltage to start said operation of said control unit;
   outputting a second initialization signal to said control unit when an abnormality is detected at said control unit.

9. A control method for an electronic apparatus having a control unit, peripheral circuits having operations controlled by the control unit, and a rechargeable battery feeding operation power to the control unit and the peripheral circuits, the rechargeable battery being charged by electricity fed from a power supply, comprising:

making a determination whether an abnormality has occurred in the control unit;

outputting a first initialization signal to said control unit during at least one of a first and second periods of time, said first period of time when voltage supplied to said control unit is equal to or less than operation-assured voltage of said control unit, and is equal to or greater than start voltage to start operation of said control unit, said second period of time when said voltage supplied to said control unit is greater than the lower limit of operation-assured voltage of said peripheral circuits and lower than said start voltage to start said operation of said control unit;

outputting a second initialization signal to the control unit when an abnormality is detected at said control unit;

generating voltage by the power supply; and building up the voltage fed to the control unit on the basis of voltage obtained by adding the generated voltage and the voltage of the rechargeable battery.

* * * * *